United States Patent [19]
Yoshida

[11] Patent Number: 5,749,626
[45] Date of Patent: May 12, 1998

[54] ROTARY-CAM TYPE RECLINING DEVICE

[75] Inventor: Tomonori Yoshida, Yokohama, Japan

[73] Assignee: Ikeda Bussan Co., Ltd., Ayase, Japan

[21] Appl. No.: 859,114

[22] Filed: May 20, 1997

[30] Foreign Application Priority Data

May 22, 1996 [JP] Japan .................. 8-150201

[51] Int. Cl.$^6$ .................. B60N 2/22; B21K 1/30
[52] U.S. Cl. .................. 297/367; 297/362; 74/438
[58] Field of Search .................. 297/362, 367, 297/463.2; 74/438, 462

[56] References Cited

U.S. PATENT DOCUMENTS

| | | | |
|---|---|---|---|
| 4,275,924 | 6/1981 | Lehmann et al. | 297/362 |
| 4,469,376 | 9/1984 | Pelz | 297/362 |
| 4,563,039 | 1/1986 | Jorg | 297/362 |

FOREIGN PATENT DOCUMENTS 0 756 961  2/1997  European Pat. Off. .

6-125821  5/1994  Japan .

*Primary Examiner*—Peter R. Brown
*Attorney, Agent, or Firm*—Foley & Lardner

[57] ABSTRACT

A reclining device comprises a stationary base fixedly connected to a seat cushion, a pivotal, press-worked arm fixedly connected to a seat back and rotatably supported on the base and having an inner toothed portion, at least one toothed block slidably disposed between the base and the arm and having an outer toothed portion meshable with the inner toothed portion, and a rotary cam in cam-connection with the toothed block for producing an outward or inward sliding motion of the toothed block to mesh or unmesh the outer toothed portion with or from the inner toothed portion by rotation of the cam. To balance two contradictory requirements, that is reduction of undue sink mark (lack of fill) and high mechanical strength (high durability), a reinforced portion of a lack-of-fill suppressive geometry and shape, being composed of at least two outside curved faces, is integrally formed with the arm all around the circumferentially-extending stepped portion on an arm outside face opposed to an arm inside face formed with the inner toothed portion.

7 Claims, 7 Drawing Sheets

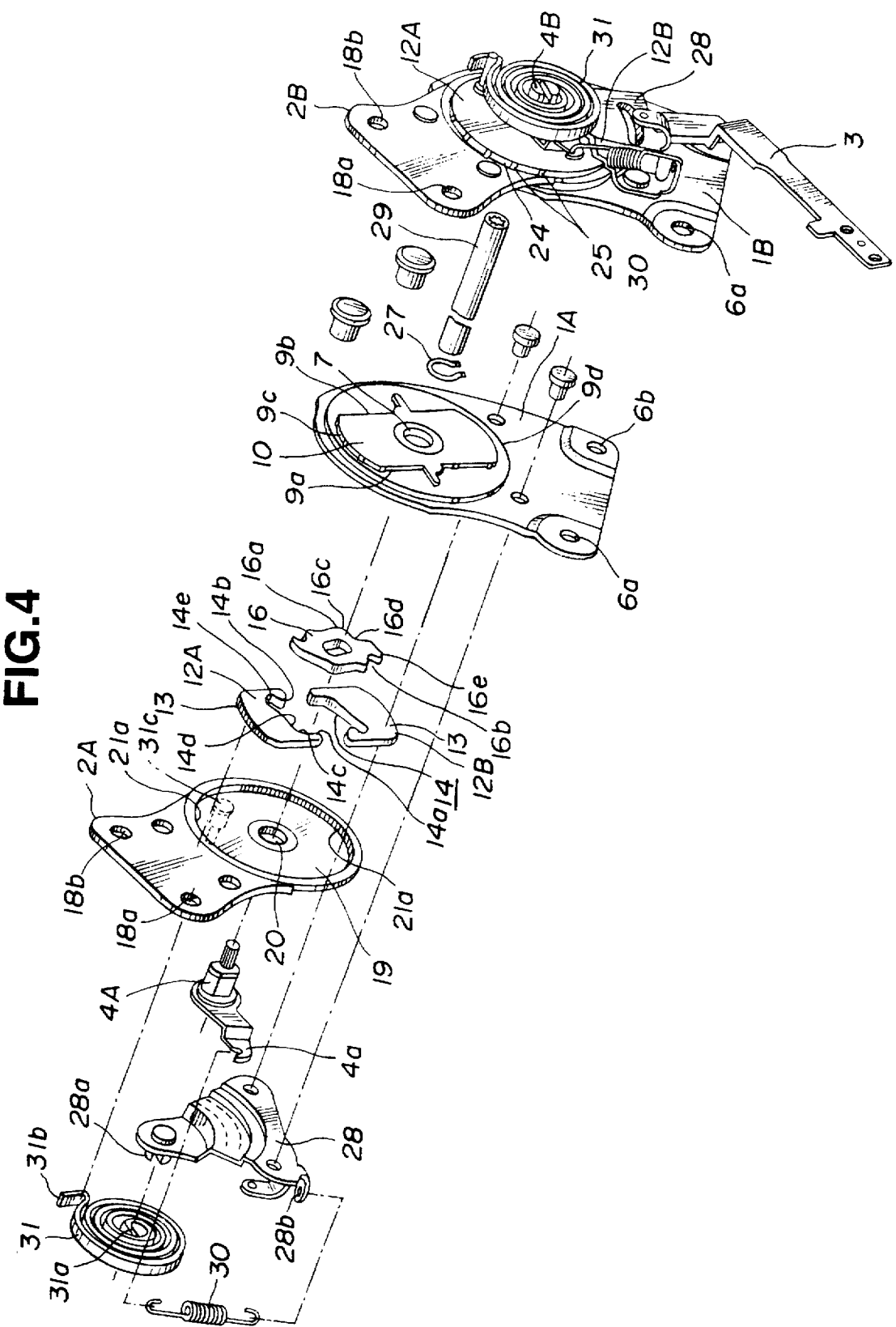

FIG.5A
FIG.5B
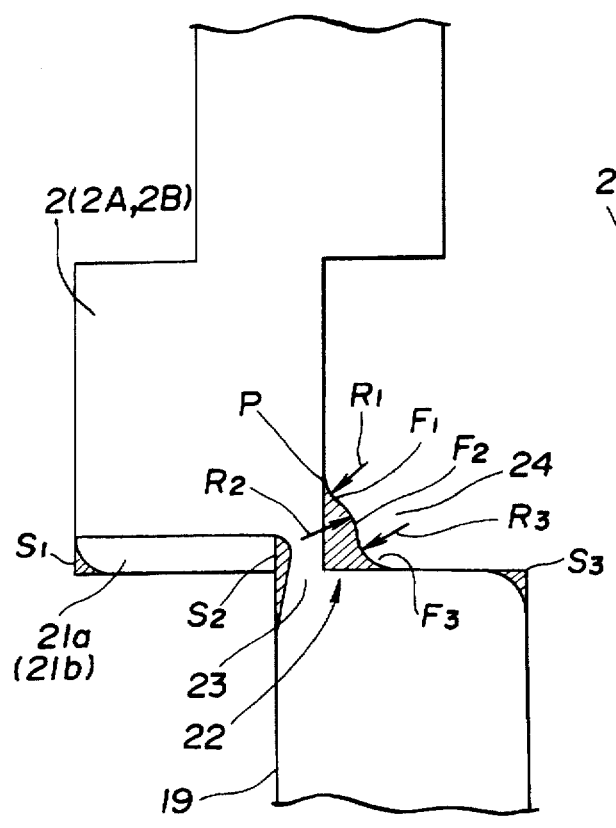
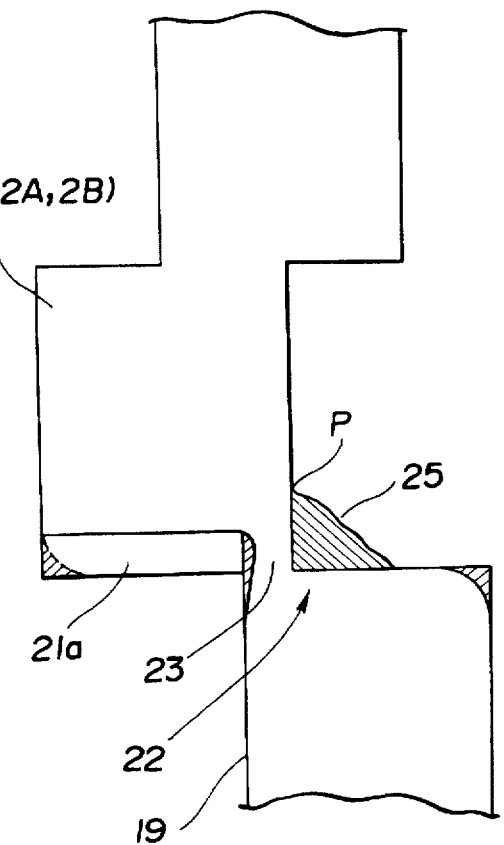

ROTARY-CAM TYPE RECLINING DEVICE

BACKGROUND OF THE INVENTION

1. Field of the Invention

The present invention relates to a rotary-cam type reclining device which is locked or unlocked by way of a rotary motion of a rotary cam mechanically linked to a reclining lever for adjusting the angular position of a seat back relative to an associated seat cushion to provide the seat occupant to the desired seat-back inclination.

2. Description of the Prior Art

In recent years, there have been proposed and developed various rotary-cam type reclining devices. One such rotary-cam type reclining device has been disclosed in Japanese Patent Provisional Publication No. 6-125821 (corresponding to French Patent Application No. 91 02590 filed on Mar. 5, 1991). A reclining device disclosed in the Japanese Patent Provisional Publication No. 6-125821 includes a stationary flange portion (called a base) fixedly connected to a seat cushion, a rotatable or pivotable flange portion (called an arm) fixedly connected to a seat back, and a rotary cam. The rotatable flange portion (the arm) is formed with an inner toothed portion on its inner periphery. The stationary flange portion is formed with a plurality of cup-like recessed portions, each radially guiding and slidably accommodating therein a toothed block. A plurality of block pushers are interposed the rotary cam and the respective toothed blocks. Each toothed block, often called "tooth inner", can be meshed with or unmeshed from the inner toothed portion of the arm by rotation of the rotary cam. In case of such rotary-cam type reclining devices, the locked state of the reclining device is kept by way of meshed-engagement between the toothed block and the inner toothed portion of the arm. Thus, it is desired to assure an increased mechanical strength of the inner toothed section of the arm. On the contrary, it is desirable to thin the thickness of the arm as much as possible in order to satisfy the requirement for light-weighting of component parts such as a pivotable arm and a stationary base. To balance these two contradictory requirements, that is light-weight and high mechanical strength (high durability), a thick-walled reinforced portion is often provided near the inner toothed portion of the arm. FIG. 7 shows a partial cross section of a pivotal arm of a prior art reclining device having the previously-discussed thick-walled reinforced portion. As seen in FIG. 7, in case of the prior art arm structure, a reinforced portion 53 of an essentially rectangular equilateral triangle (base angles are 45 degrees) in cross section, is conventionally provided at the circumferentially-extending stepped portion 52 nearing the inner toothed portion 51 of the arm member 50 so that the reinforced portion 53 is formed on one face of the arm opposed to the other face formed with the inner toothed portion 51. Ordinarily, to reduce production costs of the reclining device assembly, the reinforced portion 53 of the rectangular equilateral triangle in cross section is integrally formed with the arm member 50 all over the circumferentially-extending stepped portion 52 by way of press-working such as cold-forging. As is generally known, such press-working for example cold-forging results in lack of metal fill due to elastic deformation which can occur after press-working. In FIGS. 7, three sections denoted by $H_1$, $H_2$ and $H_3$ correspond to lack of metal fill. Such lack of fill (or shrinkage) is often called as a "sink mark". In case that the reinforced portion 53 (of the rectangular equilateral triangle in cross section) is continuously formed integral with the arm member all around the circumferentially-extending stepped portion 52, there is a tendency for the amount of metal allotted to the reinforced portion 53 to increase. The increased amount of metal allotted to the reinforced portion 53 tends to increase sink marks in some locations, namely the lack of fill $H_1$ at each edge of teeth of the inner toothed portion 51, the lack of fill $H_2$ at each corner of teeth of the inner toothed portion 51 and the lack of fill $H_3$ at each edge nearing the reinforced portion 53. Typically, the arm member 50 has a non-toothed portion in addition to an inner toothed portion 51 partly formed only within predetermined angular ranges. As may be appreciated, the sink mark H tends to be remarkably increased at a section having the inner toothed portion 51, owing to the increased amount of metal allotted to the reinforced portion 53 and also owing to a number of teeth constructing the inner toothed portion 51. This reduces a mechanical strength during meshed-engagement between the inner toothed portion 51 and the toothed block. The increased sink mark H causes the toothed block to be partly unmeshed from the inner toothed portion 51.

To avoid this, the reinforced portion of an essentially rectangular equilateral triangle in cross section is often formed integral with the arm member partly (intermittently) and circumferentially equi-distantly at predetermined angular positions. In case of the partial reinforcement, the number of reinforced points must be increased to provide adequate rigidity of the circumferentially-extending stepped portion of the arm member. This increases the difficulty of press-working to the arm member with the inner toothed portion and the reinforcement composed of a large number of reinforced portions formed circumferentially and equi-distantly along the stepped portion of the arm member. As seen in FIG. 8, the wall thickness of the stepped portion is comparatively thinned within a non-reinforced section between the two adjacent partly-reinforced portions. The prior art reclining device suffers from the additional drawback that cracks J (such as shear fracture) may occur at the non-reinforced sections owing to fatigue caused by repeated shearing force imparted thereto.

SUMMARY OF THE INVENTION

Accordingly, it is an object of the invention to provide a rotary-cam type reclining device which avoids the aforementioned disadvantages of the prior art.

It is another object of the invention to provide a rotary-cam type reclining device, which is capable of balancing two contradictory requirements, that is, suppression of undesired sink mark and high rigidity of the pivotable arm member with an inner toothed portion, irrespective of utilizing a metal material having the same thickness as an arm member employed in the prior art rotary-cam type reclining device.

Briefly speaking, a rotary-cam type reclining device made according to the present invention is featured by a somewhat thick-walled reinforcement of a specified sink-mark suppressive shape or cross-section, which reinforcement is formed all around the circumferentially-extending stepped portion nearing the inner toothed portion of the pivotable arm member.

In order to accomplish the aforementioned and other objects of the present invention, a reclining device, comprises a stationary base adapted to be fixedly connected to a seat cushion, a pivotable, press-worked arm adapted to be fixedly connected to a seat back and pivotally supported on the base by a pivot shaft, the arm formed integral with a recessed portion having an inner toothed portion on an inner peripheral wall thereof, a toothed block slidably disposed between the base and the arm and having an outer toothed portion on an outer periphery thereof, the base being formed integral with a recessed guide having guiding side walls for slidably guiding the toothed block outwardly away from a center of rotation of the arm or inwardly towards the center of rotation of the arm, a rotary cam in cam-connection with the toothed block for producing an outward sliding motion of the toothed block to mesh the outer toothed portion with the inner toothed portion by a rotary motion of the cam in a first rotational direction and for producing an inward sliding motion of the toothed block to unmesh the outer toothed portion from the inner toothed portion by a rotary motion of the cam in a second rotational direction opposing the first rotational direction, and an operating lever mechanically linked to the cam for producing the rotary motion of the cam, wherein a thick-walled reinforced portion of a lack-of-fill suppressive geometry and shape, being composed of at least two outside curved faces, is integrally formed with the arm all around a circumferentially-extending stepped portion on an arm outside face opposed to an arm inside face formed with the inner toothed portion. A part of the thick-walled reinforced portion of the lack-of-fill suppressive geometry and shape, may be formed integral with a stronger reinforced portion of an essentially rectangular equilateral triangle in cross-section, whose base angles are 45 degrees or less. The thick-walled reinforced portion of the lack-of-fill suppressive geometry and shape, is integrally formed with the arm by press-working, preferably cold-forging. The at least two outside curved faces may comprise a first curved concave surface composed of a part of circle of curvature with a first radius and a center of curvature located outside of the arm outside face opposite to the arm inside face formed with the inner toothed portion, a second curved convex surface composed of a part of circle of curvature with a second radius greater than the first radius and a center of curvature located inside of the arm inside face, and a third curved concave surface composed of a part of circle of curvature with a third radius greater than the first radius and less than the second radius and a center of curvature located outside of the arm outside face. It is preferable that a thickness of the thick-walled reinforced portion, measured in an axial direction of the pivot shaft is ⅕ or less the sum of a thickness of the inner toothed portion and a thickness of a thin-walled section of the circumferentially-extending stepped portion. It is preferable that a plurality of stronger reinforced portions are formed integral with the reinforced portion of the lack-of-fill suppressive geometry and shape, circumferentially equi-distantly at predetermined angular positions.

BRIEF DESCRIPTION OF THE DRAWINGS

FIG. 4 is a dis-assembled view of the reclining device of the embodiment shown in FIG. 1.

FIG. 5A is an enlarged partial cross-sectional view illustrating a somewhat thick-walled reinforced portion formed near the inner toothed portion of a pivotable arm member employed in the device of the embodiment and having a specified sink-mark suppressive cross-section.

FIG. 5B is an enlarged partial cross-sectional view illustrating a partial strongly-reinforced portion having an essentially rectangular equilateral triangle (base angle being 45 degrees or less) in cross section.

DESCRIPTION OF THE PREFERRED EMBODIMENTS

Figure 1:
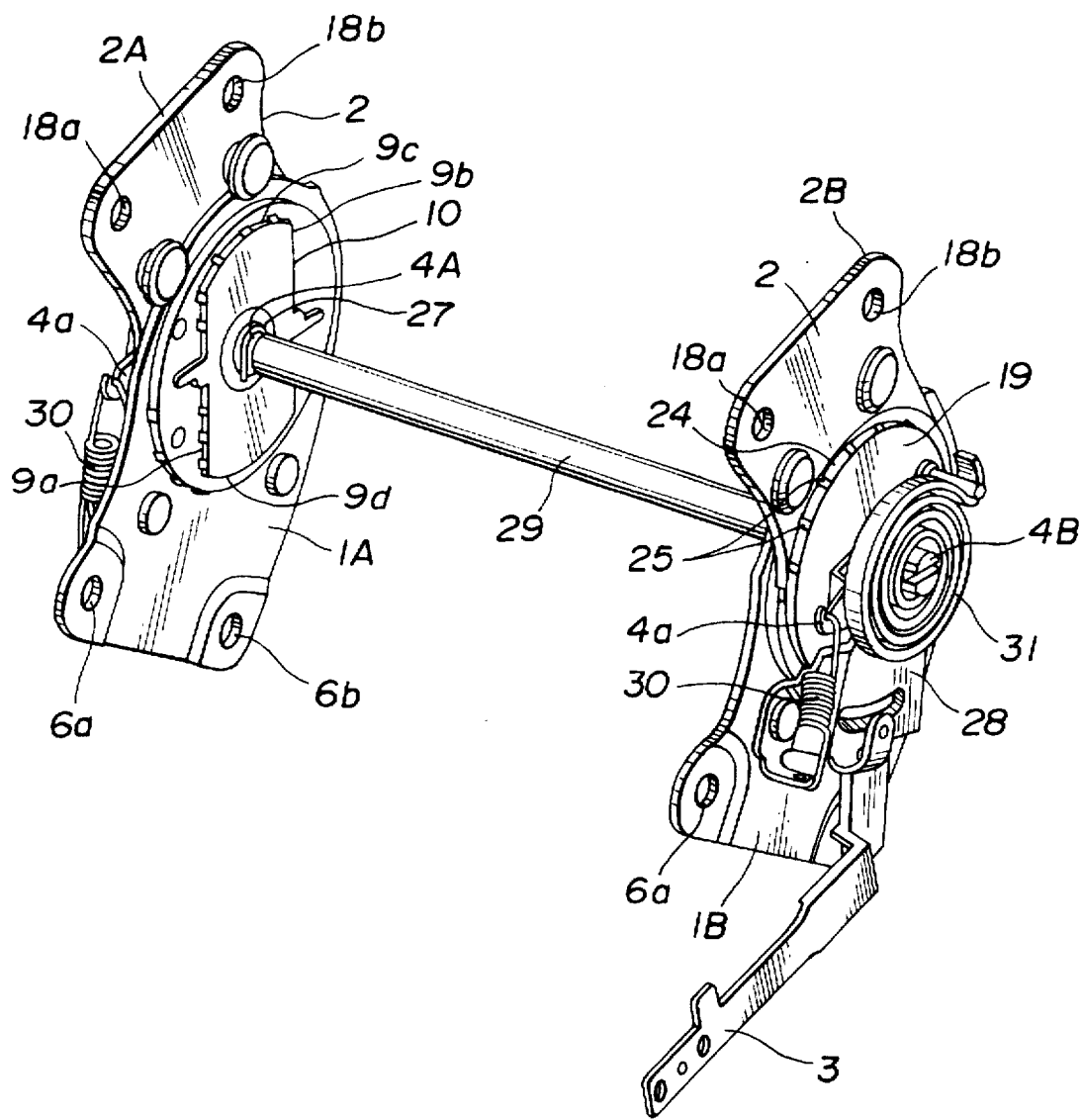
FIG. 1 is a perspective view illustrating one embodiment of a rotary-cam type reclining device made according to the invention.
Figure 2:
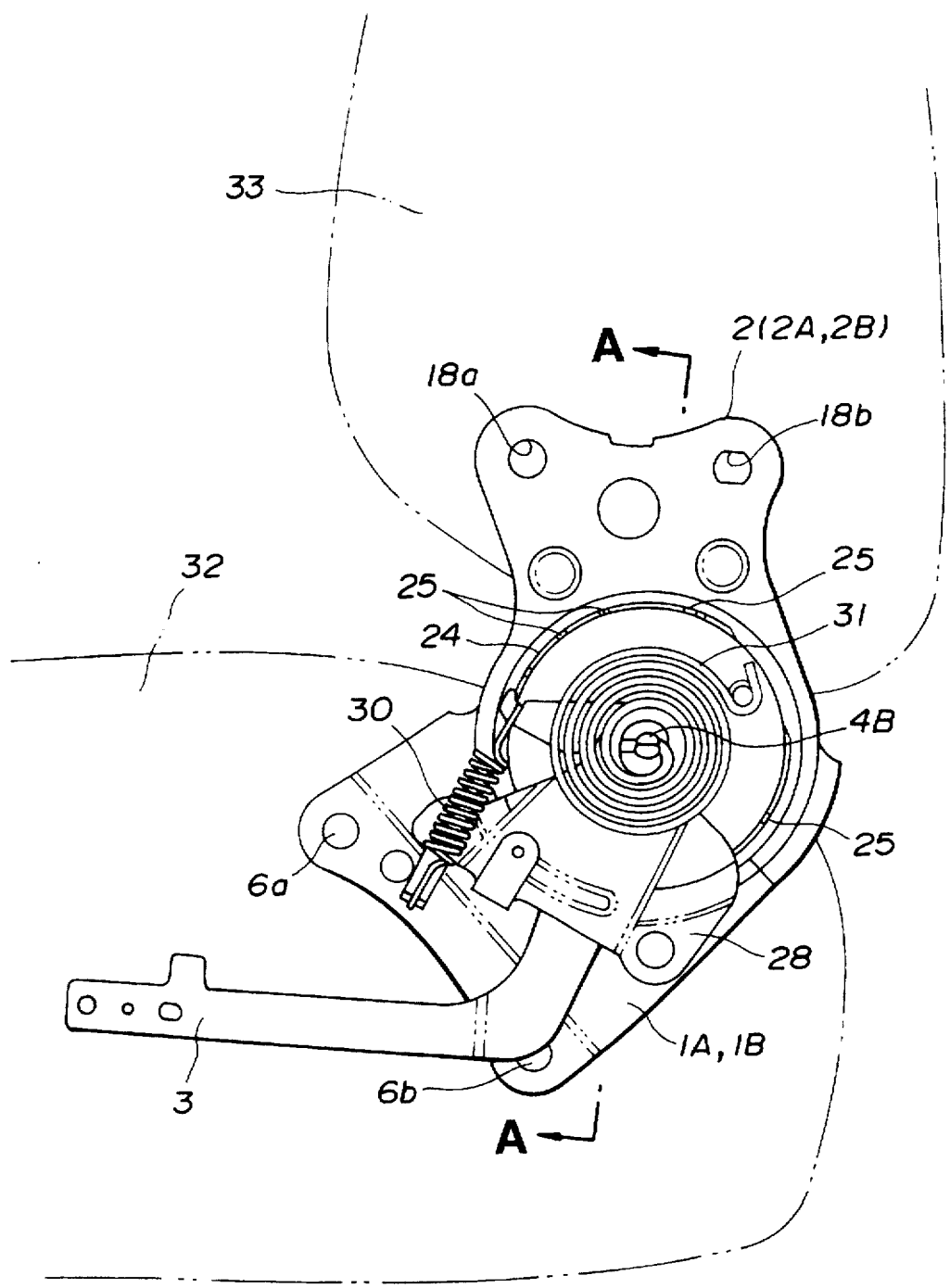
FIG. 2 is a side elevation view illustrating the reclining device of the embodiment shown in FIG. 1.
Figure 3:
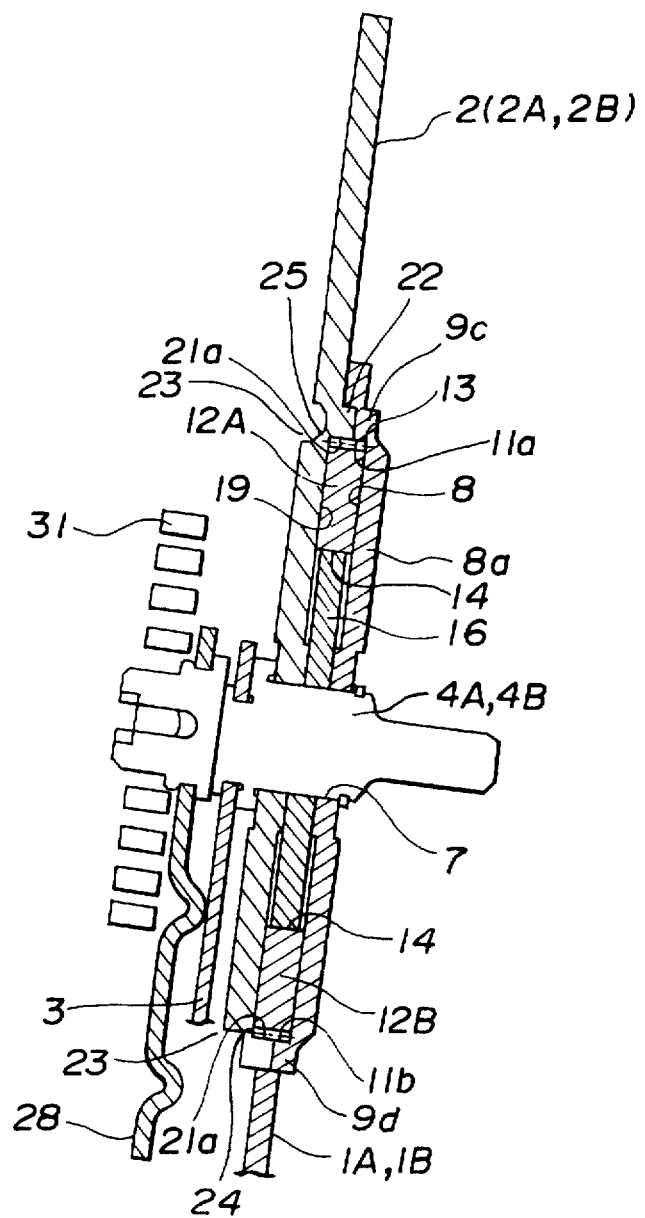
FIG. 3 is a cross-sectional view taken along the line A—A of FIG. 2.
Figure 6A:
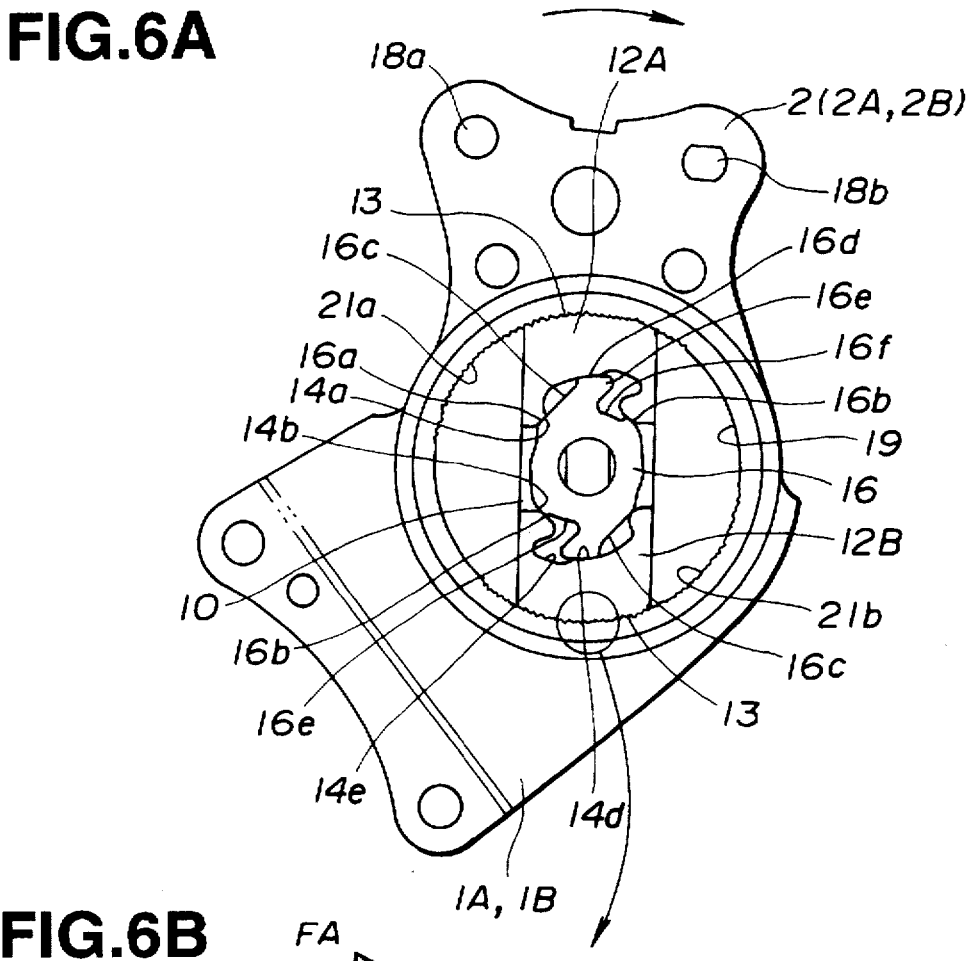
FIG. 6A is a side view showing a completely-locked state of the reclining device of the embodiment.

Referring now to the drawings, particularly to FIGS. 1, 2 and 3, the rotary-cam type reclining device of the invention is applied to a double-sided reclining apparatus in which a pair of pivotal arms 2A and 2B (which will be represented by reference sign 2 as generally referred to) are rotatably or pivotably supported on the respective stationary bases 1A and 1B (which will be represented by reference sign 1 as generally referred to) through pivot shafts 4A and 4B (which will be represented by reference sign 4) being mechanically linked to each other by means of a connecting pipe 29. Actually, the connecting pipe 29 is fixedly connected to both the innermost ends of the pivot shafts 4A and 4B by means of serration connection, spline connection or the like. As seen in FIG. 2, a reclining lever (or an operating lever) 3 is fixedly connected to the pivot shaft 4B. As appreciated from FIG. 1, a pair of reclining devices are symmetrically arranged with respect to the center line of the seat assembly. As appreciated from FIGS. 1 to 4, the construction of the left-hand reclining device is essentially similar to that of the right-hand reclining device except that only the right-hand reclining device employs the reclining lever 3. As shown in FIGS. 1 to 4, each of the bases 1A and 1B is formed with mounting-bolt holes 6a and 6b through which the associated stationary base is fixedly connected to a frame of a seat cushion 32 by means of bolts or the like. Each of the pivotal arms 2A and 2B is fixedly connected to a seat back 33 through mounting-bolt holes 18a and 18b by means of bolts or the like. As seen in FIGS. 3 and 4, the base 1 is formed with an essentially circular recessed portion 8. The base 1 (1A; 1B) has a central bore 7 in its circular recessed portion 8, the arm 2 (2A; 2B) has a central bore 20, and the rotary cam 16 has a substantially rectangular central bore (not numbered). The pivot shaft 4 of the reclining lever is rotatably fitted to the central bore 7 of the base through the central bore 20 of the arm and the substantially rectangular central bore (not numbered) of the rotary cam 16. As seen in FIGS. 1, 3 and 4, the recessed portion 8 of the base 1 has a substantially rectangular vertically-extending bottom wall portion 8a (having the central bore 7) and a substantially rectangular recessed portion 10 further recessed from the bottom wall portion 8a. The recessed portion 10 is defined by a pair of diametrically-opposing elongated, rotary-cam guiding side walls 9a and 9b, an upper circular-arc shaped side wall 9c bridging the gap between uppermost ends of the two side walls 9a and 9b, and a lower circular-arc shaped side wall 9d bridging the gap between lowermost ends of the two side walls 9a and 9b. As best seen in FIG. 3, the upper circular-arc shaped side wall 9c is formed with a curved inner toothed portion 11a, while the lower circular-arc shaped side wall 9d is formed with a curved inner toothed portion 11b. The toothed portions 11a and 11b are brought into meshed-engagement with respective outer toothed portions 13 of upper and lower toothed blocks 12A and 12B which will be fully described in detail. As seen in FIGS. 3 and 4, a pair of toothed blocks 12A and 12B are operably accommodated in the recessed portion 10 of the base in such a manner as to be slidable radially with respect to the pivot shaft, while being guided by the guiding side walls 9a and 9b. As best seen in FIG. 4, each of the toothed blocks 12A and 12B has the outer toothed portion 13 and a cam-contour surface 14 on its inner periphery. As best seen in FIGS. 4 and 6A, the respective cam-contour surfaces (14; 14) of the toothed blocks 12A and 12B are point-symmetrical with respect to the axis of the central bore 7 of the base. Each cam-contour surface 14 comprises a pair of substantially 45°-sloped cam-connection portions 14a and 14b formed at both ends of the inner peripheral wall surface of the respective toothed block (12A; 12B), a curved portion 14c curved from the 45°-sloped cam-connection portion 14a in the clockwise direction, a substantially straight cam-connection portion 14d horizontally extending from the innermost end of the curved portion 14c, and a curved groove-cut portion 14e being continuous with the 45°-sloped cam-connection portion 14b and the substantially straight horizontally-extending cam-connection portion 14d. On the other hand, the rotary cam 16 is formed with a pair of diametrically-opposing cam-profile surfaces on its outer periphery. As best seen in FIG. 6A, each of the pair of cam-profile surfaces of the rotary cam 16 comprises two slightly-raised cam portions 16a and 16b being abuttable with the respective cam-connection portions 14a and 14b, a moderately-curved cam portion 16c curved from the slightly-raised cam portion 16a in the clockwise direction, an essentially-straight cam portion 16d being continuous with the curved cam portion 16c, a finger-tip like cam portion 16e extending clockwise from the cam portion 16d and a slightly undulated groove-cut portion 16f defined between the finger-tip like cam portion 16e and the raised cam portion 16b. As seen in FIG. 4, the pivot shaft 4 has a pair of diametrically-opposing circular-arc faces and a pair of rectangular flat faces. Each circular arc-face serves as a sliding surface which is slidably fitted to the inner peripheral surface of the central bore 20 of the arm. For co-rotation with the pivot shaft 4 of the operating lever 3, the substantially-rectangular bore of the rotary cam 16 is contoured in a manner so as to be precisely fitted onto the pivot shaft 4 without any play. After the pivot shaft 4 is fitted into the bore 7 of the base 1 while supporting thereon the arm 2 and the rotary cam 16, a snap ring 27 is fitted on the free end of the pivot shaft 4 to prevent the axial movement of the pivot shaft 4 relative to the base 1. The arm 2 is formed integral with an essentially cylindrical ring-gear like recessed portion 19 having the same radius as the two circular-arc shaped side walls 9c and 9d diametrically opposed to each other. The ring-gear like recessed portion 19 is formed with a pair of inner toothed portions 21a and 21b on its inner peripheral wall surface such that these toothed portions 21a (the center of the upper toothed portion 21a being slightly angularly counter-clockwise offset from the uppermost end of the ring-like recessed portion 19 in FIG. 6A) and 21b (the center of the lower toothed portion 21b being slightly angularly counter-clockwise offset from the lowermost end of the ring-like recessed portion 19 in FIG. 6A) are diametrically opposite to each other within a pre-determined angular range such as 120 degrees. As seen in FIG. 6A, the two inner toothed portions 21a and 21b of the arm are point-symmetrical with respect to the axis of the pivot shaft 4. When assembling, the pair of upper and lower toothed blocks 12A and 12B are operably accommodated in an internal space defined between the ring-gear like recessed portion 19 of the arm 2 and the substantially rectangular recessed portion 10 of the base 1, so that the outer toothed portion 13 of each toothed block (12A; 12B) is meshable with and unmeshable from the associated inner toothed portion (21a; 21b) of the arm 2, and so that the rotary cam 16 is rotatably accommodated in the toothed blocks 12A and 12B. The pair of toothed blocks 12A and 12B are point-symmetrical with respect to the axis of the pivot 4. As previously described, the base 1 has the pair of diametrically-opposing curved inner toothed portions 11a and 11b being formed on the respective curved side walls 9a and 9b of the recessed portion 10. The inner diameter of the ring-gear like recessed portion 19 of the arm 2 is identical to the inner diameter of the diametrically-opposing curved side walls 9a and 9b. Thus, the outer toothed portion 13 of the upper toothed block 12A are meshable with or unmeshable from both the inner toothed portion 21a of the arm and the inner toothed portion 11a of the base to insure an increased mechanical strength of the reclining device kept in its completely locked state. The operating lever or the reclining lever 3 is formed with an armed portion 4a having a spring slot at which one hooked end of a return spring 30 (for example a coiled tension spring) is hanged. The other hooked end of the return spring 30 is hanged at a bracket 28b of a holder 28 which is fixedly connected to the base 1 by means of rivets or the like. As a result, the operating lever is biased to its initial position (a spring-loaded position) by way of the bias of the spring 30. The holder 28 is also formed integral with a slotted shaft 28a. The slotted portion of the slotted shaft 28a is engaged with the innermost central end 31a of a return spring 31 such as a spiral spring. The outermost curled end 31b of the return spring 31 is engaged with a pin 31c fixed to the arm 2. Thus, the seat back 33 fixedly connected to the arm 2 is permanently forced to tilt forward (anti-clockwise viewing FIG. 2). The previously-noted structure of the reclining device is conventional and forms no part of the present invention.

The rotary-cam type reclining device made according to the invention is different from a conventional reclining device in that an arm member employed in the reclining device of the present invention is formed with a reinforced portion of special geometry, dimensions and shape which are effective to prevent lack of metal fill due to elastic deformation or to suppress a so-called "sink mark" which may occur at the press-worked arm member. The reinforced portion of the arm will be hereinafter described in detail by reference to FIGS. 3, 5A and 5B.

Figure 7:
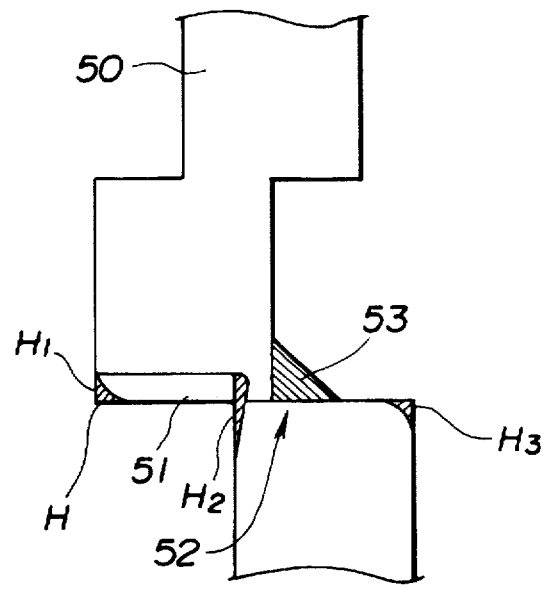
FIG. 7 is an enlarged partial cross-sectional view illustrating a thick-walled reinforced portion formed near the inner toothed portion of a pivotable arm member employed in the prior art reclining device.
Figure 8:
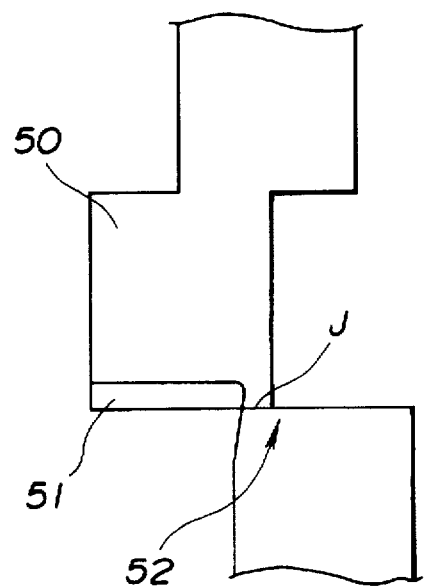
FIG. 8 is an enlarged partial cross-sectional view illustrating a non-reinforced portion of the arm member employed in the prior art reclining device.

As seen in FIGS. 3, 5A and 5B, the arm 2 (2A; 2B) is formed with a circumferentially-extending stepped portion 22 extending substantially along the tooth tip circle of the inner toothed portions 21a and 21b. The stepped portion 22 is formed with a thin-walled section 23 owing to a sink mark $S_2$ being formed at the tooth bottom of the respective inner toothed portions 21a and 21b. Note that the circumferentially-extending stepped portion 22 of the arm 2 is formed integral with a somewhat thick-walled, reinforced portion 24 (of special geometry, dimensions and shape) all around the stepped portion 22 on the outside face facing apart from the inside face having the inner toothed portions 21a and 21b. As seen in FIG. 5A, the somewhat thick-walled, reinforced portion 24 is a substantially right-angled triangle in radial cross-section. The substantially right-angled triangle of the reinforced portion 24 has two straight sides right-angled to each other and a moderately curved, undulated hypotenuse (like a compressed S shape) in radial cross-section. The moderately curved or undulated outside face (moderately curved or undulated hypotenuse) is composed of a concave curved surface $F_1$ beginning from a particular position P located outward of the tooth bottom circle of the inner toothed portions 21a and 21b and extending toward the stepped portion 22, a concave curved surface $F_3$ being in contact with an outer cylindrical surface of the stepped portion 22, and a convex curved surface $F_2$ being continuous between the two concave surfaces $F_1$ and $F_3$. The concave curved surface $F_1$ corresponds a part of circle of curvature with a comparatively small radius $R_1$ and a center of curvature located in the outside arm section opposite to the inside arm section with the inner toothed portions 21a and 21b. The convex curved surface $F_2$ is curved from the lower end of the concave curved surface $F_1$ to a degree that the lower end of the convex curved surface $F_2$ is substantially parallel with the side wall of the thin-walled section 23. The convex curved surface $F_2$ corresponds to a part of circle of curvature with a comparatively large radius $R_2$ greater than the radius $R_1$ and a center of curvature located in the inside arm section with the inner toothed portions 21a and 21b. The concave curved surface $F_3$ is curved from the lower end of the convex curved surface $F_2$ to a degree that the lower end of the concave curved surface $F_3$ comes into contact with the outer cylindrical surface of the stepped portion 22. The concave curved surface $F_3$ corresponds to a part of circle of curvature with a medium radius $R_3$ greater than the radius $R_1$ and less than the radius $R_2$ and a center of curvature located in the outside arm section opposite to the inside arm section with the inner toothed portions 21a and 21b. As set forth above, the outside undulated face ($F_1$; $F_2$; $F_3$) of the reinforced portion 24 is formed into a substantially compressed S shape, and additionally the thickness of the reinforced portion 24, measured in the axial direction of the pivot shaft 4, is suppressed or reduced to approximately ⅕ the sum of the thickness of each of the inner toothed portions 21a and 21b and the thickness of the thin-walled section 23. Thus, when press-working the pivotal arm member 2, the lack of fill $S_1$ at each edge of teeth of the inner toothed portions 21a (21b), the lack of fill $S_2$ at each corner of teeth of the inner toothed portions 21a (21b), and the lack of fill $S_3$ at each edge of the cylindrical portion of the stepped portion 22 are suppressed or reduced adequately, as may be appreciated from comparison of the sink marks (the lack of fill) $S_1$, $S_2$ and $S_3$ shown in FIG. 5A with the sink marks $H_1$, $H_2$ and $H_3$ shown in FIG. 7. In other words, the reinforced portion 24 of the particular sink-mark suppressive geometry and shape is very effective to reduce the lack of metal fill which may occur after press-working. This was assured by the inventor of the present application. In the shown embodiment, although the moderately curved hypotenuse of the substantially right-angled triangle of the reinforced portion 24 is composed of three curved surfaces, namely $F_1$, $F_2$ and $F_3$, the hypotenuse may be composed of at least two curved surfaces such as a concave curved surface and a convex curved surface to provide the same effect, that is effective suppression of lack of fill, as the hypotenuse composed of the three curved surfaces. According to the reclining device of the present invention employing an arm member formed integral with a reinforced portion 24 of the particular sink-mark suppressive geometry and shape, since the reinforced portion 24 is formed all around the circumferentially-extending stepped portion 22 on the outside face of the arm opposed to the inside face formed with the inner toothed portions 21a and 21b, the reinforced portion 24 of the previously-discussed sink-mark suppressive geometry and shape functions to effectively suppress or reduce the lack of metal fill (the sink mark) which may occur after press-working. Additionally, the reinforced portion 24 continuously formed all around the stepped portion 22, increases the thickness of the thin-walled section 23 of the stepped portion 22. This ensures an increased mechanical strength enough to be proof against repeated shearing force imparted to the arm and to prevent undue shear fracture which may occur due to fatigue caused by repeated shearing force imparted to the arm in the direction perpendicular to both faces of the arm. As seen in FIG. 5B, it is preferable that the reinforced portion 24 is partly formed with a plurality of stronger reinforced portions 25. As seen in FIG. 5B, the cross-section of each of the stronger reinforced portions 25 is similar to that of a reinforced portion 53 (of an essentially rectangular equilateral triangle whose base angles are 45 degrees) formed in an arm member of the prior art device. As best seen in FIGS. 1 and 2, in the case that the stronger reinforced portions 25 are further provided partly or intermittently in addition to the circumferentially-extending reinforced portion 24 of the special geometry, dimensions and shape, the mechanical strength of the arm may be further increased.

Figure 6B:
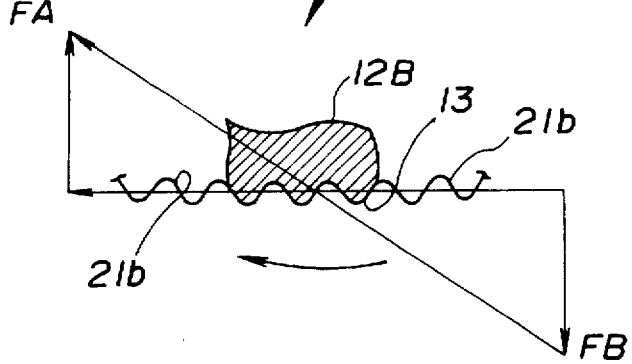
FIG. 6B is an illustration of a statical analysis of the components of a force applied to the toothed block and to the arm member due to the arm loaded in the clockwise direction.

Referring now to FIGS. 6A and 6B, there are shown force components FA and FB produced owing to clockwise rotation of the arm under a locked condition of the reclining device. Under the locked condition in which the outer toothed portions 13 of the toothed blocks 12A and 12B are in meshed-engagement with the inner toothed portions 21a and 21b of the pivotable arm 2, when the arm 2 is loaded clockwise as shown in FIG. 6A, two force components FA and FB can be created at the two meshing portions between the outer toothed portions 13 of the toothed blocks 12A and 12B and the respective inner toothed portions 21a and 21b of the arm 2. In the case of the lower meshing portion shown in FIG. 6B, the force component FA acts to inwardly (upwardly) move the associated toothed block (the lower toothed block 12B), while the force component FB acts to outwardly expand (downwardly move) the inner toothed portion 21b of the arm 2. The force component FB (acting to outwardly move the arm 2) produces a shearing force acting on the thinned-wall section 23, since the inner toothed portions 21a and 21b are formed on the inner peripheral surface of the ring-like recessed portion 19 and the thinned-wall section 23 is formed close to the inner toothed portion. The shearing force caused by the force component FB acts on the thinned-wall section 23 regardless of the thinned-wall section 23 ranging within the inner toothed portions 21a and 21b or another thinned-wall section 23 ranging within the non-toothed portions defined between the toothed portions 21a and 21b. In the shown embodiment, since the thinned-wall section 23 is effectively reinforced throughout the inner toothed portions 21a and 21b by means of the reinforced portion 24 of the previously-discussed particular sink-mark suppressive geometry and shape, the reinforced arm provide a mechanical strength enough to be proof against the shearing force, thus preventing undue shear fracture which may occur due to fatigue caused by the repeated shearing force. In addition to the above-mentioned shearing force created by the force component FB at the meshing portion, an additional shearing force, caused by clockwise rotation of the seat back and acting circumferentially, is also applied to the thinned-wall section 23 ranging within the toothed portions 21a and 21b. In the modified reinforced arm structure of the invention, since the so-called sink-mark suppressive reinforced portion 24 is partly formed with circumferentially equi-distant spaced stronger reinforced portions 25, each having a narrow width as seen in FIGS. 1 and 2. Such stronger reinforced portions 25 provides a satisfactory mechanical strength enough to be proof against the circumferentially-acting shearing force caused by the clockwise rotation of the seat back.

As will be appreciated from the above, the use of the previously-explained particular sink-mark suppressive geometry and shape composed of the plural curved surfaces or portions $F_1$, $F_2$ and $F_3$, can ensure an adequate mechanical strength or high durability against the repeated shearing force, while effectively suppressing the undue sink-mark or lack of fill after press-working such as cold-forging.

The reclining device of the embodiment operates as follows.

As shown in FIG. 1, suppose that the pivot shafts 4A and 4B are biased counterclockwise by way of the bias of the return spring 30 and thus engaged with the respective holders 28. Under this condition, the rotary cam is rotated in the anti-clockwise direction so that the cam portions 16a, 16b and 16d of the rotary cam 16 abut the respective cam-connection portions 14a, 14b and 14d of the cam-contour surface 14. The toothed blocks 12A and 12B slide radially outward, while being guided by the guiding side walls 9a and 9b of the recessed portion 10 of the base 1 (1A; 1B). Thus, the outer toothed portions 13 of the toothed blocks 12A and 12B are brought into meshed-engagement with the inner toothed portions 21a and 21b of the pivotal arm 2 (2A; 2B) and the inner toothed portions 11a and 11b of the base 1 (1A; 1B). In such a case, each of the reclining devices of the double-sided reclining apparatus is maintained at the completely locked state in which there is no relative rotation of the pivotal arms 2A and 2B with respect to the respective bases 1A and 1B. In such a completely locked state, the side walls of the toothed blocks 12A and 12B engage with the respective guiding side walls 9a and 9b of the recessed portion 10 of the base 1 and additionally the outer toothed portions 13 of the toothed blocks are also in meshed-engagement with the inner toothed portions 11a and 11b of the recessed portion of the base 1 (1A and 1B). Under these conditions, for example, in the event that the seat back 33 is excessively loaded by impact force caused by accidental collision of the vehicle, the impact force is transmitted through the pivotal arm 2 to the toothed blocks 12A and 12B. The impact load transferred to the respective toothed blocks 12A and 12B is distributed into and received by the guiding side walls 9a and 9b of the base 1 (1A; 1B) and the inner toothed portions 11a and 11b of the base. A bearing pressure loaded on the guiding side walls 9a and 9b can be reduced to approximately half, thus suppressing undesired deformation of or damage to the guiding side walls and ensuring a reliable reclining function. For the purpose of shifting from the previously-noted completely-locked state to the unlocked state, when the operating lever 3 is pulled up and rotated clockwise (viewing FIG. 1) against the bias of the spring 30, the rotary cam 16 also rotates clockwise from its initial position (the spring-loaded position). The clockwise rotation of the cam 16 permits the cam portions 16a, 16b and 16d to be kept out of engagement with the respective cam-connection portions 14a, 14b and 14d of the cam profile of the cam 14 of each of the toothed blocks 12A and 12B. Then, the arm 2 becomes rotated anti-clockwise, since the arm 2 is permanently forced counter-clockwise by way of the return spring 31. In conjunction with the clockwise motion of the rotary cam 14, such a rotational motion of the arm produces an inward sliding motion (or the contracted motion) of the toothed block pair (12A; 12B). In this manner, the outer toothed portions (13; 13) of the toothed block pair are unmeshed from the inner toothed portions 21a and 21b of the arm 2 and from the inner toothed portions 11a and 11b of the base 1 by way of the clockwise rotation of the lever 3. Under these conditions, the seat back 33 can be adjusted toward a desired inclination angle position. Thereafter, when the lever 3 is returned again to the initial position with the seat back adjusted at the desired angular position, the rotary cam 16 also rotates anti-clockwise together with the lever 3. As a result, the toothed blocks 12A and 12B become slid outwards, and thus the outer toothed blocks 12A and 12B are brought again into meshed-engagement with the inner toothed portions 21a and 21b of the arm and with the inner toothed portions 11a and 11b of the base. In this manner, the angular adjustment of the seat back can be attained.

Although the reclining device of the embodiment is exemplified in case of a diametrically-opposing two toothed blocks (12A; 12B) in cam-connection with a rotary cam, the device according to the invention may be applied to a rotary-cam type reclining device with three or more toothed blocks provided between a rotary cam and inner toothed portions of a rotatable arm, as disclosed in the Japanese Patent Provisional Publication No. 6-125821 (corresponding to French Patent Application No. 91 02590 filed on Mar. 5, 1991). In the shown embodiment, each of a plurality of stronger reinforced portions 25 is partly formed as a press-worked reinforcement of an essentially rectangular equilateral triangle whose base angles are 45 degrees. In lieu thereof, for the purpose of balancing two contradictory requirements, reduction of undue sink mark (lack of fill) and high mechanical strength (high durability), each of the stronger reinforced portions is a substantially right-angled equilateral triangle in radial cross-section and the substantially right-angled equilateral triangle of the reinforced portion has two straight sides right-angled to each other and a concave curved hypotenuse, and each of two base angles are less than 45 degrees.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A reclining device, comprising:
    a stationary base (1) adapted to be fixedly connected to a seat cushion (32);
    a pivotable, press-worked arm (2) adapted to be fixedly connected to a seat back (33) and pivotally supported on said base by a pivot shaft (4), said arm (2) formed integral with a recessed portion (19) having an inner toothed portion (21a; 21b) on an inner peripheral wall thereof;
    a toothed block (12A; 12B) slidably disposed between said base (1) and said arm (2) and having an outer toothed portion (13) on an outer periphery thereof;
    said base (1) being formed integral with a recessed guide (10) having guiding side walls for slidably guiding said toothed block (12A; 12B) outwardly away from a center of rotation of said arm or inwardly towards the center of rotation of said arm;
    a rotary cam (16) in cam-connection with said toothed block (12A; 12B) for producing an outward sliding motion of said toothed block to mesh said outer toothed portion (13) with said inner toothed portion (21a; 21b) by a rotary motion of said cam in a first rotational direction and for producing an inward sliding motion of said toothed block to unmesh said outer toothed portion (13) from said inner toothed portion (21a; 21b) by a rotary motion of said cam in a second rotational direction opposing said first rotational direction; and an operating lever (3) mechanically linked to said cam for producing said rotary motion of said cam;

wherein a thick-walled reinforced portion (24) of a lack-of-fill suppressive geometry and shape, being composed of at least two outside curved faces, is integrally formed with said arm all around a circumferentially-extending stepped portion (22) on an arm outside face opposed to an arm inside face formed with said inner toothed portion (21a; 21b).

2. A reclining device as claimed in claim 1, wherein a part of said thick-walled reinforced portion (24) of said lack-of-fill suppressive geometry and shape, is formed integral with a stronger reinforced portion (25) of an essentially rectangular equilateral triangle in cross-section, whose base angles are 45 degrees or less.

3. A reclining device as claimed in claim 2, wherein a plurality of stronger reinforced portions (25) are formed integral with said thick-walled reinforced portion (24) of the lack-of-fill suppressive geometry and shape, circumferentially equi-distantly at predetermined angular positions.

4. A reclining device as claimed in claim 1, wherein said thick-walled reinforced portion (24) of said lack-of-fill suppressive geometry and shape, is integrally formed with said arm by press-working.

5. A reclining device as claimed in claim 1, wherein said thick-walled reinforced portion (24) of said lack-of-fill suppressive geometry and shape, is integrally formed with said arm by cold-forging.

6. A reclining device as claimed in claim 1, wherein said at least two outside curved faces comprise a first curved concave surface ($F_1$) composed of a part of circle of curvature with a first radius ($R_1$) and a center of curvature located outside of the arm outside face opposite to the arm inside face formed with said inner toothed portion (21a; 21b), a second curved convex surface ($F_2$) composed of a part of circle of curvature with a second radius ($R_2$) greater than said first radius and a center of curvature located inside of the arm inside face, and a third curved concave surface ($F_3$) composed of a part of circle of curvature with a third radius ($R_3$) greater than said first radius ($R_1$) and less than the second radius ($R_2$) and a center of curvature located outside of the arm outside face.

7. A reclining device as claimed in claim 6, wherein a thickness of said thick-walled reinforced portion (24), measured in an axial direction of said pivot shaft (4) is ⅕ or less the sum of a thickness of said inner toothed portion (21a; 21b) and a thickness of a thin-walled section (23) of said circumferentially-extending stepped portion (22).

* * * * *